(12) United States Patent
Spiss et al.

(10) Patent No.: US 12,119,893 B2
(45) Date of Patent: Oct. 15, 2024

(54) NFC DEVICE, OPERATING METHOD AND COMPUTER PROGRAM

(71) Applicant: NXP B.V., Eindhoven (NL)

(72) Inventors: Thomas Spiss, Sankt Radegund (AT); Markus Wobak, Graz (AT); Abu Syed Firoz Ismail, Rellingen (DE)

(73) Assignee: NXP B.V., Eindhoven (NL)

( * ) Notice: Subject to any disclaimer, the term of this patent is extended or adjusted under 35 U.S.C. 154(b) by 385 days.

(21) Appl. No.: 17/653,136

(22) Filed: Mar. 2, 2022

(65) Prior Publication Data

US 2022/0321173 A1 Oct. 6, 2022

(30) Foreign Application Priority Data

Apr. 1, 2021 (EP) .................................. 21166687

(51) Int. Cl.
*H04B 5/00* (2024.01)
*H04B 5/72* (2024.01)
(Continued)

(52) U.S. Cl.
CPC ................. *H04B 5/77* (2024.01); *H04B 5/72* (2024.01); *H04B 5/73* (2024.01)

(58) Field of Classification Search
CPC .... G06Q 20/3278; G06Q 20/352; H04B 5/72; H04B 5/73; H04B 5/77
(Continued)

(56) References Cited

U.S. PATENT DOCUMENTS

| 8,240,561 B2 | 8/2012 | Busch-Sorenson |
| 10,614,450 B1 | 4/2020 | Templeton et al. |

(Continued)

FOREIGN PATENT DOCUMENTS

| EP | 2315170 A1 | 4/2011 |
| EP | 2575408 A1 | 4/2013 |

(Continued)

OTHER PUBLICATIONS

U.S. Appl. No. 17/447,956; Inventor, Thomas Spiss et al.; "NFC Device and Method of Operating the Same;" filed Sep. 17, 2021.
(Continued)

*Primary Examiner* — Tan H Trinh

(57) ABSTRACT

In one embodiment, a near field communication (NFC) device is provided, comprising: a communication unit configured to be communicatively coupled to an NFC reader; a processing unit configured to use a plurality of emulated cards for executing one or more applications; a profile determination unit configured to determine a polling profile of said NFC reader, wherein the polling profile represents a sequence of predefined radio frequency (RF) transmission events, and wherein the profile determination unit is configured to determine said polling profile by comparing a detected sequence of RF transmission events with one or more predetermined sequences; a card selection unit configured to select a specific one of said emulated cards for use by the processing unit in dependence on the polling profile determined by the profile determination unit. In another embodiment, a corresponding method of operating an NFC device is conceived. In another embodiment, a computer program is provided for carrying out a method of the kind set forth.

15 Claims, 7 Drawing Sheets

(51) Int. Cl.
*H04B 5/73* (2024.01)
*H04B 5/77* (2024.01)

(58) Field of Classification Search
USPC .............................................. 455/41.1, 41.2
See application file for complete search history.

(56) References Cited

U.S. PATENT DOCUMENTS

| | | |
|---|---|---|
| 11,637,591 B2 * | 4/2023 | Spiss ........................ H04B 5/77 |
| | | 455/41.1 |
| 2009/0077277 A1 | 3/2009 | Vidal et al. |
| 2012/0178366 A1 | 7/2012 | Levy et al. |
| 2012/0278432 A1 * | 11/2012 | Luna ..................... H04L 41/147 |
| | | 709/217 |
| 2013/0006849 A1 | 1/2013 | Morris |
| 2013/0084798 A1 | 4/2013 | Faithorn |
| 2015/0099465 A1 * | 4/2015 | Suzuki .................... H04W 4/60 |
| | | 455/41.1 |
| 2015/0162954 A1 | 6/2015 | Socol et al. |
| 2015/0186871 A1 * | 7/2015 | Laracey ............... G06Q 20/322 |
| | | 705/41 |
| 2015/0339659 A1 * | 11/2015 | Ballesteros ...... G06Q 20/38215 |
| | | 705/76 |
| 2015/0381238 A1 * | 12/2015 | Wolf ........................ H04B 5/72 |
| | | 455/41.1 |
| 2016/0127857 A1 | 5/2016 | O'Donoghue et al. |
| 2016/0302025 A1 | 10/2016 | Bell et al. |
| 2017/0055109 A1 | 2/2017 | Van Nieuwenhuyze et al. |
| 2018/0082285 A1 * | 3/2018 | Prabhakar .......... G06Q 20/3224 |
| 2018/0158043 A1 | 6/2018 | Noe et al. |
| 2020/0286061 A1 | 9/2020 | Wang et al. |
| 2021/0067201 A1 * | 3/2021 | Wang ...................... H04W 4/80 |
| 2021/0344495 A1 * | 11/2021 | Rule ................ G06Q 20/40975 |
| 2022/0116076 A1 * | 4/2022 | Spiss ................. G06K 19/0723 |

FOREIGN PATENT DOCUMENTS

| | | |
|---|---|---|
| EP | 2626823 A1 | 8/2013 |
| EP | 3133852 A1 | 2/2017 |
| EP | 3467746 A1 | 4/2019 |
| WO | 2016/100112 A1 | 6/2016 |

OTHER PUBLICATIONS

Notice of Allowance mailed Jan. 26, 2023 for U.S. Appl. No. 17/447,956, 17 Pages.

* cited by examiner

NFC DEVICE, OPERATING METHOD AND COMPUTER PROGRAM

CROSS-REFERENCE TO RELATED APPLICATIONS

This application claims priority under 35 U.S.C. § 119 to European Patent Application No. 21166687.0, filed on Apr. 1, 2021, the contents of which are incorporated by reference herein.

TECHNICAL FIELD

The present disclosure relates to a near field communication device. Furthermore, the present disclosure relates to a corresponding method of operating a near field communication device, and to a corresponding computer program.

BACKGROUND

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions.

SUMMARY

In accordance with a first aspect of the present disclosure, a near field communication (NFC) device is provided, comprising: a communication unit configured to be communicatively coupled to an NFC reader; a processing unit configured to use a plurality of emulated cards for executing one or more applications; a profile determination unit configured to determine a polling profile of said NFC reader, wherein the polling profile represents a sequence of predefined radio frequency (RF) transmission events, and wherein the profile determination unit is configured to determine said polling profile by comparing a detected sequence of RF transmission events with one or more predetermined sequences; a card selection unit configured to select a specific one of said emulated cards for use by the processing unit in dependence on the polling profile determined by the profile determination unit.

In one or more embodiments, the profile determination unit comprises: a detector configured to detect the sequence of predefined RF transmission events when the communication unit is communicatively coupled to the NFC reader; a comparator configured to compare the detected sequence of predefined RF transmission events with the predetermined sequences and output one of said predetermined sequences as the determined polling profile.

In one or more embodiments, the comparator is configured to output the predetermined sequence that is most similar to or equal to the detected sequence of predefined RF transmission events as the determined polling profile.

In one or more embodiments, the detector is configured to detect the number of predefined RF transmission events and the periods elapsing between said predefined RF transmission events, and the comparator is configured to compare both said number and said periods with corresponding numbers and periods of each of the predetermined sequences.

In one or more embodiments, the card selection unit is configured to select said specific emulated card using a programmable mapping table in which predetermined sequences are mapped to said emulated cards.

In one or more embodiments, the NFC device further comprises a non-volatile memory configured to store the programmable mapping table.

In one or more embodiments, the profile determination unit is further configured to operate in a learning mode in which the predetermined sequences are captured.

In one or more embodiments, the profile determination unit is configured, when operating in a regular mode, to determine the polling profile of the NFC reader in a first observation window, and the profile determination unit is configured, when operating in the learning mode, to capture the predetermined sequences in a second observation window, wherein the second observation window is longer than the first observation window.

In one or more embodiments, when the detected sequence of RF transmission events is shorter than the predetermined sequences, the profile determination unit is configured to shift the detected sequence along each of the predetermined sequences in order to compare the detected sequence with the predetermined sequences.

In one or more embodiments, said emulated cards are used for carrying out transactions with the NFC reader.

In accordance with a second aspect of the present disclosure, a method of operating a near field communication (NFC) device is conceived, the NFC device comprising a communication unit, a processing unit, a profile determination unit and a card selection unit, the method comprising: communicatively coupling the communication unit to an NFC reader; determining, by the profile determination unit, a polling profile of said NFC reader, wherein the polling profile represents a sequence of predefined radio frequency (RF) transmission events, and wherein the profile determination unit determines said polling profile by comparing a detected sequence of RF transmission events with one or more predetermined sequences; selecting, by the card selection unit, a specific one of a plurality of emulated cards in dependence on the polling profile determined by the profile determination unit; using, by the processing unit, the specific emulated card for executing an application.

In one or more embodiments, the profile determination unit comprises a detector and a comparator, and: the detector detects the sequence of predefined RF transmission events when the communication unit is communicatively coupled to the NFC reader; the comparator compares the detected sequence of predefined RF transmission events with the predetermined sequences and outputs one of said predetermined sequences as the determined polling profile.

In one or more embodiments, the comparator outputs the predetermined sequence that is most similar to or equal to the detected sequence of predefined RF transmission events as the determined polling profile.

In one or more embodiments, the detector detects the number of predefined RF transmission events and the periods elapsing between said predefined RF transmission events, and the comparator compares both said number and said periods with corresponding numbers and periods of each of the predetermined sequences.

In accordance with a third aspect of the present disclosure, a computer program is provided, comprising executable instructions which, when executed by a near field communication (NFC) device, cause said NFC device to carry out a method of the kind set forth.

DESCRIPTION OF DRAWINGS

Embodiments will be described in more detail with reference to the appended drawings, in which.

DESCRIPTION OF EMBODIMENTS

Figure 1:
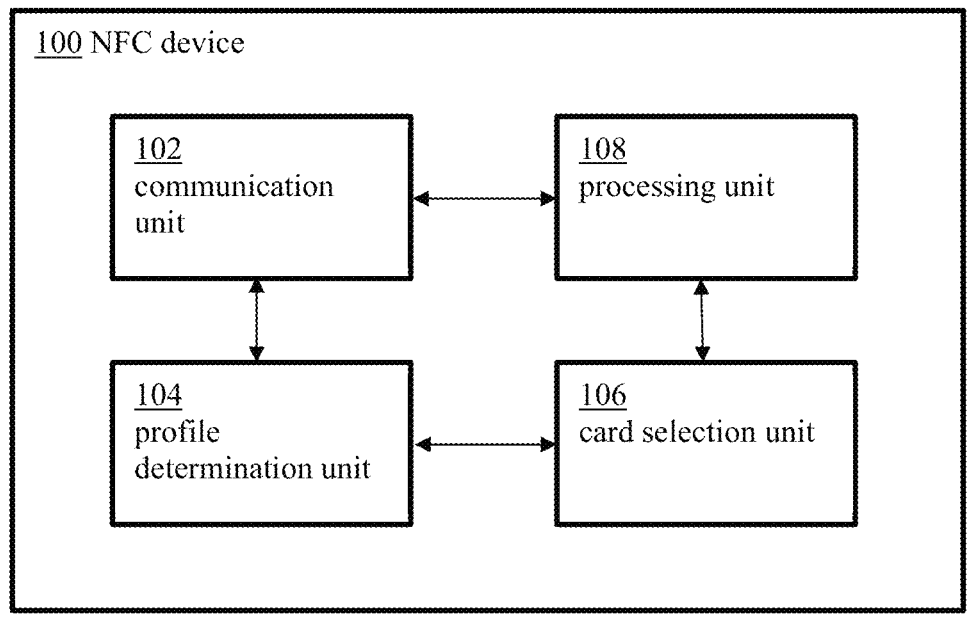
FIG. 1 shows an illustrative embodiment of an NFC device.

As mentioned above, near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions.

For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are typically loaded into the mobile devices. In those cases, a processing unit comprised in such a mobile device may execute an application (e.g., a mobile wallet application) that uses a digital representation of a physical transaction card to carry out a specific transaction. Such a digital representation of a physical transaction card may be referred to as an emulated card or an embedded card. In particular, an emulated card may be regarded as a virtual replica of a physical card. For instance, an emulated card may be implemented using a non-volatile memory. Typically, cryptographic methods are applied to access certain parts of the memory. Depending on the use case, related application-specific information may be stored in those parts of the memory. This information may include a unique identifier (e.g., a card number or an employee number), access credentials or a balance equivalent to money (e.g., a so-called "top-up card"). Furthermore, so-called NFC readers may be used to communicate and exchange data with physical NFC-enabled transaction cards and/or emulated or embedded cards.

It is noted that a mobile device of the kind set forth typically supports different types of transactions, for which different emulated cards should be used by the processing unit. For example, a mobile wallet application may contain a plurality of such emulated cards. Furthermore, different applications may be executed by the processing unit, each of which may use different emulated cards. Therefore, it may be difficult to select a correct emulated card when the mobile device is brought into close proximity of a particular NFC reader (i.e., an NFC terminal).

More specifically, if a mobile wallet application contains or is associated with multiple registered cards, then it should be defined which of those cards is to be used for the next NFC transaction. If a wrong card is used, then the transaction will fail and has to be carried out again after activating the correct card. This failed transaction will be recognized by a communication counterpart (e.g., a transit gate reader, door access reader, or payment terminal) and will lead to delays as well potentially additional user actions (e.g., removing and presenting the device again to the reader's field). To prevent this, users have to select one card as the currently active card in the mobile wallet application based on the next transaction they want to perform. In some cases, cards may be enabled based on the location of the mobile device, but given the high density of NFC and RFID terminals in modern cities (e.g., multiple payment, transport or door access readers in close proximity), this approach may not be sufficient to ensure that the correct card is selected.

Now discussed are a near field communication device and a corresponding method of operating a near field communication device, which facilitate selecting a correct emulated card among a plurality of available emulated cards.

FIG. 1 shows an illustrative embodiment of an NFC device 100. The NFC device 100 comprises a communication unit 102, a profile determination unit 104, a card selection unit 106 and a processing unit 108. The communication unit 102 is configured to be communicatively coupled to an external NFC reader (not shown). Furthermore, the processing unit 108 is configured to use a plurality of emulated cards for executing one or more applications. Furthermore, the profile determination unit 104 is configured to determine a polling profile of said NFC reader, wherein the polling profile represents a sequence of predefined radio frequency (RF) transmission events. More specifically, the profile determination unit 104 is configured to determine said polling profile by comparing a detected sequence of RF transmission events with one or more predetermined sequences. Finally, the card selection unit 106 is configured to select a specific one of said emulated cards for use by the processing unit 108 in dependence on the polling profile determined by the profile determination unit 104. By selecting a card in dependence on a polling profile, the likelihood that a correct card is selected may be increased. Thus, the selection of a correct card among a plurality of available cards is facilitated. In particular, a polling profile may be represented by a pattern or sequence of RF transmission events, which may be detected by the NFC device 100 when the communication unit 102 is communicatively coupled to the NFC reader. For instance, a polling profile may be characterized by timestamps which are indicative of the timing of predefined RF transmission events (for example, a FieldOn event, a FieldOff event, a terminal transmission event in a given RF technology, and a given frequency of the RF field). It is noted that each terminal (i.e., NFC reader) may have a different polling profile. Furthermore, it is noted that the term "emulated card" may be interpreted broadly, in the sense that it may refer to any digital representation of a function which may be carried out by a physical card, to application-related data stored in a physical card and/or to other functional elements or components which are typically available in a physical card of the kind set forth. Accordingly, an emulated card may not merely refer to a complete virtual replica of a physical card, but also to a partial virtual replica of a physical card.

In one or more embodiments, the profile determination unit comprises a detector configured to detect the sequence of predefined RF transmission events when the communication unit is communicatively coupled to the NFC reader, and a comparator configured to compare the detected sequence of predefined RF transmission events with the predetermined sequences and output one of said predetermined sequences as the determined polling profile. Thereby, the determination of the polling profile is facilitated. Furthermore, in one or more embodiments, the comparator is configured to output the predetermined sequence that is most similar to or equal to the detected sequence of predefined RF transmission events as the determined polling profile. In this way, the accuracy of the profile determination may be increased. For instance, as explained hereinbelow, a matching process may be executed to identify the predetermined sequence that is most similar to or equal to the detected sequence of predefined RF transmission events. Furthermore, in one or more embodiments, the detector is configured to detect the number of predefined RF transmission events and the periods elapsing between said predefined RF transmission events, and the comparator is configured to compare both said number and said periods with corresponding numbers and periods of each of the predetermined sequences. In this way, the accuracy of the profile determination may be further increased. In particular, the number of RF transmission events and their timing (i.e., the time differences between the consecutive events) may provide a suitable characterization of a polling profile.

In one or more embodiments, the card selection unit is configured to select said specific emulated card using a programmable mapping table in which predetermined sequences are mapped to said emulated cards. In this way, the selection of the card is facilitated. In a practical implementation, the NFC device further comprises a non-volatile memory configured to store the programmable mapping table. In one or more embodiments, the profile determination unit is further configured to operate in a learning mode in which the predetermined sequences are captured. This facilitates predetermining the sequences with which the detected sequence of RF transmission events is to be compared. Furthermore, in one or more embodiments, the profile determination unit is configured, when operating in a regular mode, to determine the polling profile of the NFC reader in a first observation window, and wherein the profile determination unit is configured, when operating in the learning mode, to capture the predetermined sequences in a second observation window, wherein the second observation window is longer than the first observation window. In this way, the sequences with which the detected sequence is to be compared may be predetermined with sufficient accuracy, while avoiding that the performance of the NFC device is negatively affected when it operates in the regular mode. Furthermore, in one or more embodiments, when the detected sequence of RF transmission events is shorter than the predetermined sequences, the profile determination unit is configured to shift the detected sequence along each of the predetermined sequences in order to compare the detected sequence with the predetermined sequences. In this way, the comparison of the detected sequence with the predetermined sequences is facilitated. In a practical implementation, the emulated cards are used for carrying out transactions with the NFC reader.

Figure 2:
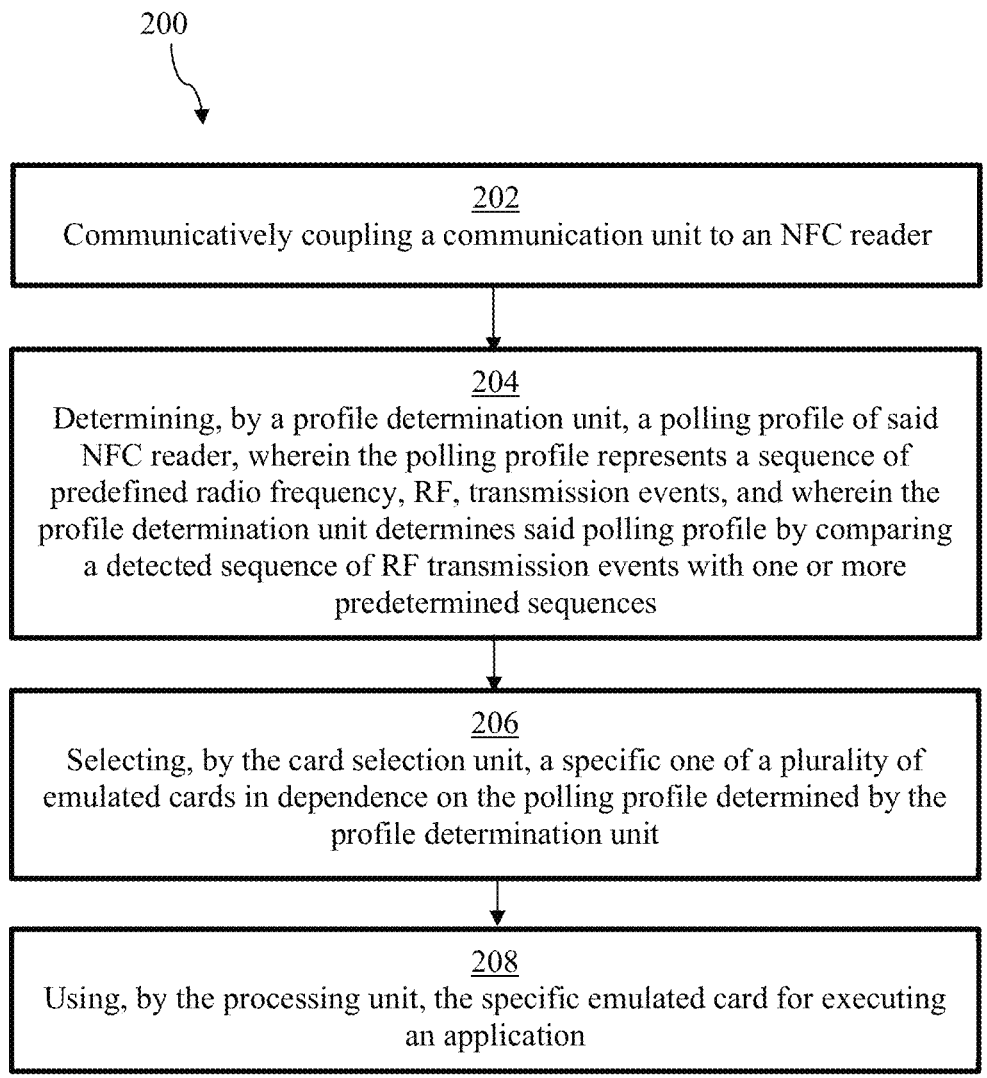
FIG. 2 shows an illustrative embodiment of a method of operating an NFC device.

FIG. 2 shows an illustrative embodiment of a method 200 of operating an NFC device. The method 200 includes the following steps. At 202, a communication unit of an NFC device is communicatively coupled to an NFC reader, which is external to the NFC device. At 204, a profile determination unit of said NFC device determines a polling profile of the NFC reader, wherein the polling profile represents a sequence of predefined radio frequency, RF, transmission events. More specifically, the profile determination unit determines said polling profile by comparing a detected sequence of RF transmission events with one or more predetermined sequences. Furthermore, at 206, a card selection unit of the NFC device selects a specific one of a plurality of emulated cards in dependence on the polling profile determined by the profile determination unit. Finally, at 208, a processing unit of the NFC device uses the specific emulated card for executing an application. As mentioned above, by selecting a card in dependence on a polling profile, the likelihood that a correct card is selected may be increased. Thus, the selection of a correct card among a plurality of available cards is facilitated.

NFC and RFID reader terminals are found in several use cases of daily life. Examples include contactless payment, transit ticketing (subway, buses, etc.), access control (hotels, home access), loyalty programs in shops or various other leisure activities with related ticketing. Accordingly, a user may have several different physical NFC cards. In the meantime, mobile NFC devices such as mobile phones have been provided with the functionality to digitize and emulate physical cards. These emulated cards may be stored in a so-called "mobile wallet". In such a case, an NFC application has to select the card to be used for a so-called customer media (CM) transaction. Typically, a user has to select the card to be used before a RF transaction can be carried out. This is not convenient for users, since it involves an additional step in the use case execution. Furthermore, this reduces the end-to-end system throughput, for example in a transit ticketing process. In accordance with the present disclosure, RF polling profiles containing a pattern or sequence of RF transmission events as well as the timings of said events may be used as a criterion for selecting the best fitting card from the mobile wallet. In a practical implementation, the determination of the polling profile may be based on a probability metric which is indicative of the extent or degree to which a detected sequence of events matches with predetermined candidate sequences. For instance, a measured RF polling profile (i.e., a detected sequence of RF transmission events) may be compared with reference RF polling profiles (i.e., predetermined sequences of RF transmission events). Furthermore, a metric may be introduced to calculate the matching probability based on the number of matches between a reference and the variably shifted measured RF polling profiles and the associated average time difference error. Accordingly, specific RF terminals may be identified with a high likelihood. This may be useful in door lock use cases, in which a user wants to pair an emulated access card with a specific physical RF reader terminal.

It is noted that NFC RF terminals may check whether communication counterparts are present by enabling their RF field and using modulation techniques and polling commands defined in corresponding RF standards. For NFC communication various RF technologies are defined. Examples of such technologies include NFC-A, NFC-B, NFC-F212, NFC-F424 and NFC-V. The terminals should consider certain timings including the time from enabling the RF field until sending the first RF frame in a certain RF technology, the time between polling for various RF technologies and/or the time to disable the RF field after polling for the last RF technology. Some RF technologies, such as the EMVCo proximity coupling device (PCD) technology for payment terminals, define strict polling profiles. Other proprietary applications, such as those found in transit or access applications, may have varying polling profiles. Thus, the RF polling profile of a specific terminal may be regarded as a "fingerprint", which can be used to identify a specific terminal. This holds for example in door lock use cases, where the user wants to pair an emulated access card with a specific physical RF reader terminal. It is noted that a NFC reader terminal polling profile may be defined as a sequence of RF transmission events and corresponding timings between those RF transmission events. Examples of RF events include enabling and disabling the RF field by the terminal or transmitting polling commands in specific RF technologies. Furthermore, it is noted that RF polling events may not only be restricted to specific RF technologies, but may also be refined to consider the payload of the polling command.

Figure 3:
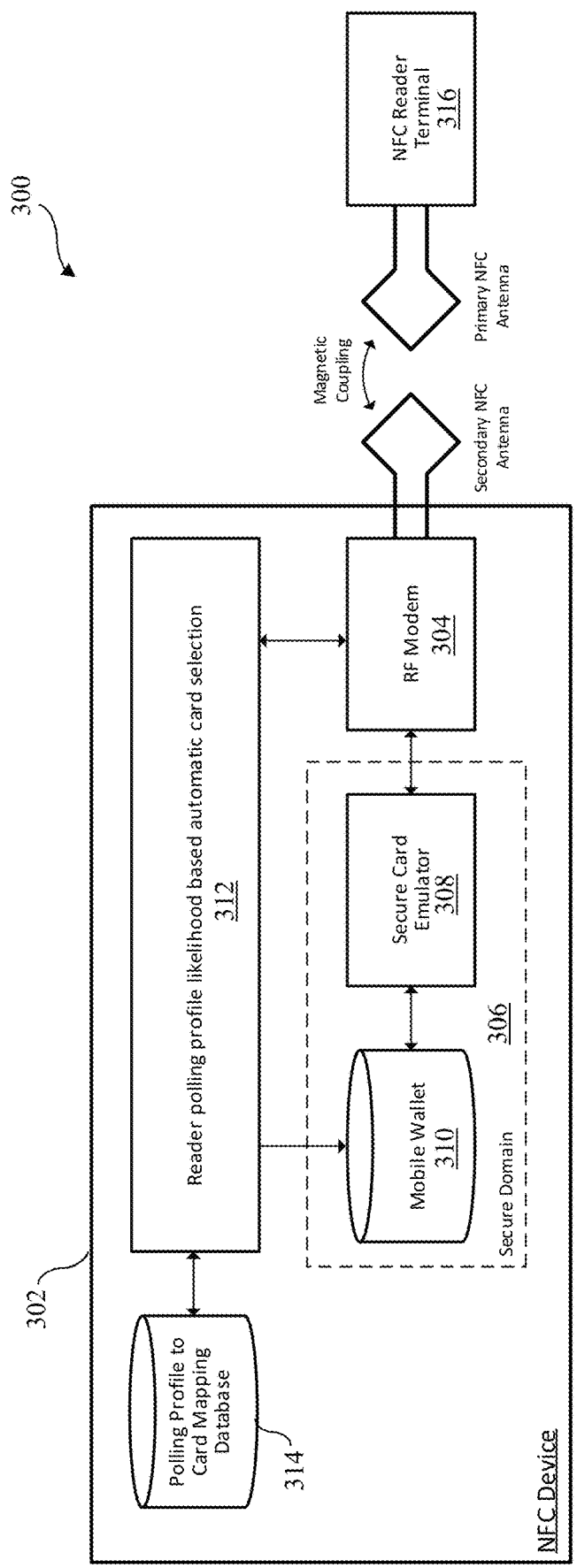
FIG. 3 shows an illustrative embodiment of an NFC system.

FIG. 3 shows an illustrative embodiment of an NFC system 300. The system 300 includes an NFC device 302 having a reader polling likelihood based automatic card selection unit 312. An NFC reader terminal 316 is in the proximity of the NFC device 302. Both devices 302, 316 have NFC antennas which are magnetically coupled. The NFC reader terminal 316 is polling for supported counterparts in related NFC RF technologies. More specifically, the NFC device 302 contains an RF modem 304, a secure domain 306, said reader polling profile likelihood based automatic card selection unit 312 and a polling profile to card mapping database 314. The secure domain 306 contains a secure card emulator 308 and a mobile wallet 310, which together provide the emulated card functionality. In particular, a plurality of cards may be emulated. From these cards, only one can be selected to be emulated in a secure card emulation at a given time. It is noted that in some implementations the NFC device 302 may not include the secure domain 306 and only have a mobile wallet 310 and a secure card emulator 308. The polling profile to card mapping database 314 is stored in a non-volatile memory (not shown). In particular, said database 314 may contain pairs of stored RF reader profiles (i.e., polling profiles) linked to matching cards in the mobile wallet 310. It is noted that cards themselves are not stored in the mapping database 316. Furthermore, it is noted that in addition to the determined polling profile, other conditions may be used for selecting a specific card.

In operation, the reader polling profile likelihood based automatic card selection unit 312 may enable the RF modem 304 for a defined observation time period (i.e., observation window) and collects observed RF events. The RF modem 304 may be configured to operate in a listen-only mode, in which it does not respond to NFC reader terminal polling commands. In particular, an integer count of N RF transmission events may be collected during an observation time T and the result may be a sequence of RF transmission events characterized by two parameters: (1) the number of RF transmission events over time $e_i$ and (2) the time differences $\Delta t_i$, i.e. the time elapsed between current events and preceding events, wherein $\Delta t_0$ may be defined to be 0, and wherein i is an integer number between 0 and N−1. These parameters form a data set that may be regarded as a fingerprint by means of which a particular terminal can be identified.

Figure 4:
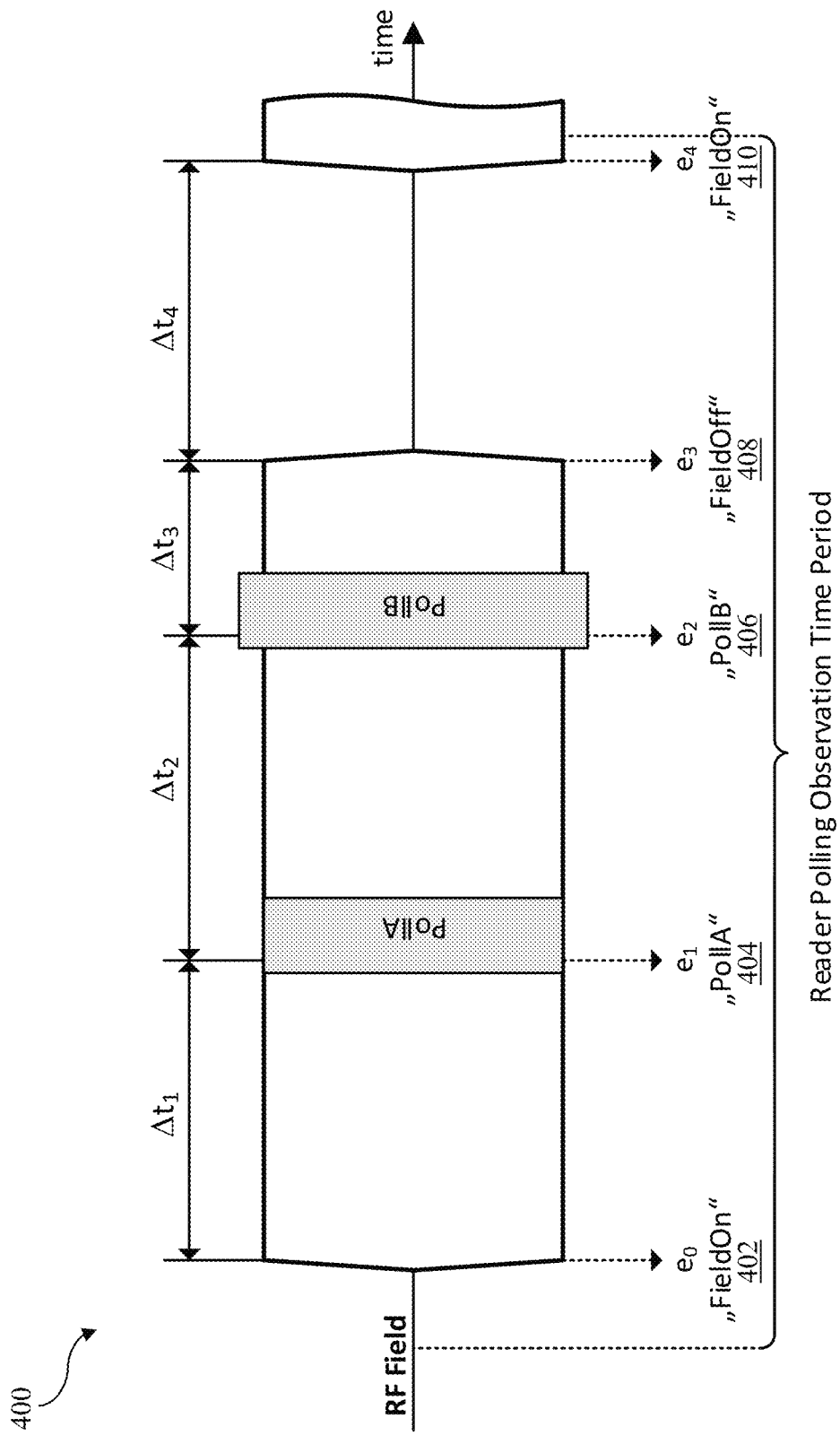
FIG. 4 shows an illustrative embodiment of a sequence of RF transmission events.

FIG. 4 shows an illustrative embodiment of a sequence 400 of RF transmission events. In particular, an illustrative example of an observed reader polling profile is shown. The terminal (i.e., reader) is polling for RF technologies NFC-A and NFC-B. The sequence of events includes the events FieldOn (turning on the RF field), PollA (transmission of a polling command for NFC-A), PollB (transmission of a polling command for NFC-B), FieldOff (turning off the RF field). Furthermore, the sequence is characterized by specific periods elapsing between said events. In this example, the number of occurring events (i.e., 5 events) and the timings between the events ($\Delta t_1$, $\Delta t_2$, $\Delta t_3$, $\Delta t_4$) form a data set by means of which the reader can be identified as being of a particular type. As mentioned above, this data set may be regarded as a fingerprint of the terminal. This fingerprint is defined as a sequence or list which is characterized by the events in the sequence or list and the periods elapsing between the events. More specifically, the fingerprint may be characterized by the number of events, the type of events, the order in which events of different types occur, as well as the periods elapsing between the events. For instance, one terminal may have a polling profile comprising the events FieldOn-PollA-PollB-FieldOff-FieldOn and the associated time differences (deltas) as shown in FIG. 4. Another terminal may have another polling profile (not shown), which comprises other events, another order of the same events and/or other associated time differences. For instance, the sequence FieldOn-PollB-PollA-FieldOff-FieldOn having the same associated time differences as shown in FIG. 4 may already represent a different fingerprint, because the order of the events PollA and PollB has been reversed.

It is noted that there may be a processing delay between the start of the polling and the creation of the RF event. In particular, some time may elapse between the moment when an event is visible on the RF interface (for example, enabling the RF field) and the moment when the event is internally reported by the RF modem. The processing delay might depend on analog signal transmission and digital processing delays. This depends on the RF modem implementation and adds only a negligible uncertainty to the RF polling profile.

The NFC device, and in particular the profile determination unit of the NFC device, may be configured to operate in a learning mode, which allows a user to add a new mapping of a card to a specific reader. In this learning mode, the system may also trigger the profile determination unit to capture a reader polling profile during a configurable period (i.e., a configurable observation window). In a practical implementation, this configurable period may have a length of 500 to 1000 ms to ensure having enough statistics for the subsequent profile matching process, which may be carried out when the profile determination unit operates in a regular mode. The resulting captured sequences, e.g. RF events over time and the time differences between these events, may then be stored in the mapping database and may be associated with a card in the mobile wallet. Subsequently, when the NFC device operates in the regular mode of operation, the user may bring the NFC device into close proximity of a reader, with the reader polling profile likelihood based automatic card selection being enabled. Then, the system may first measure the instantaneous reader polling profile. It is noted that the observation window used for this capture may be shorter than the observation window used when the device operates in the learning mode. For instance, the observation window for the regular mode may have a length of 100 to 300 ms. Thereby, processing time delays may be reduced, and the user experience may be improved, while the impact on the detection performance is minimized.

Figure 5:
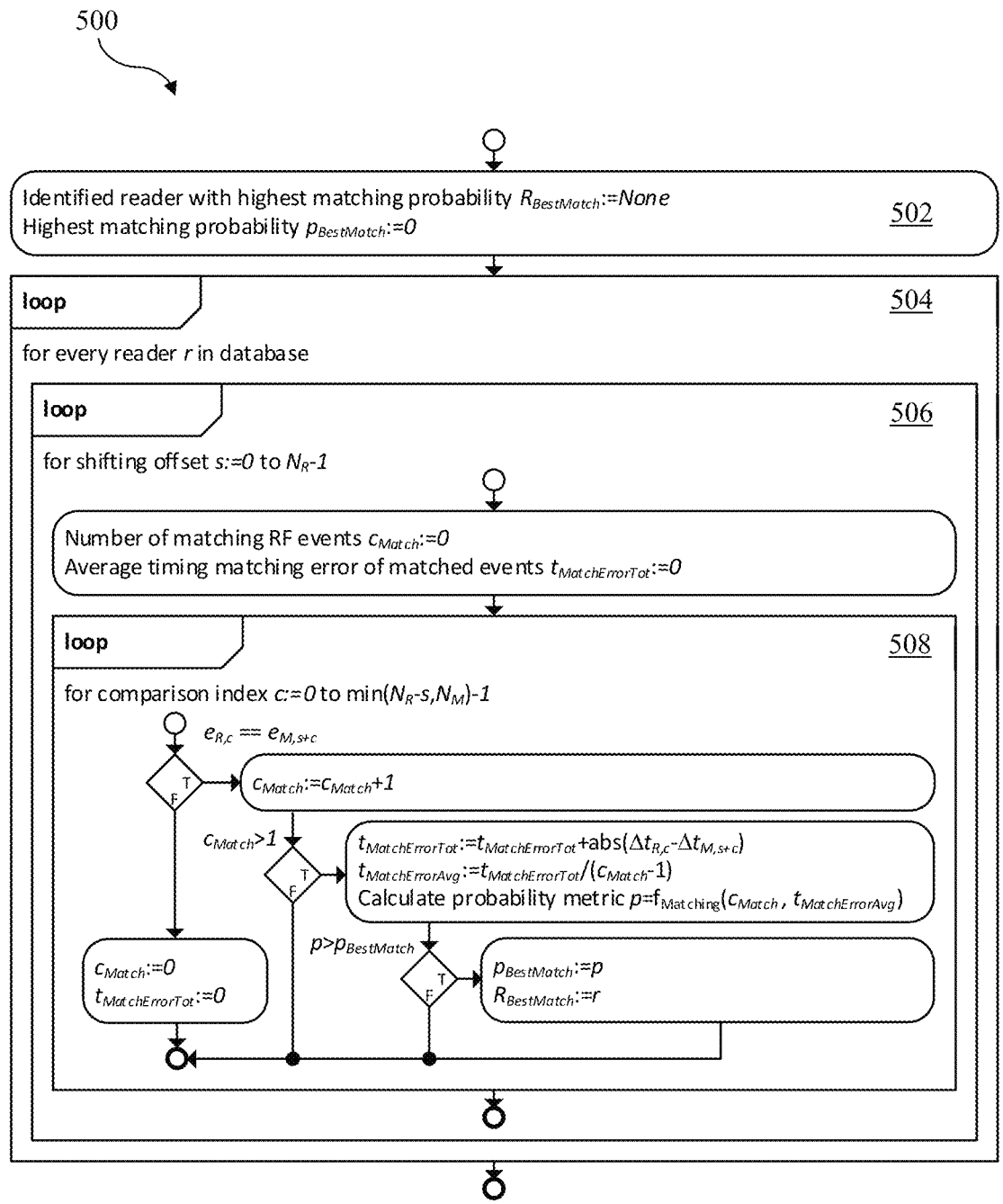
FIG. 5 shows an illustrative embodiment of a polling profile matching process.

FIG. 5 shows an illustrative embodiment of a polling profile matching process 500. The process 500 contains an initialization step 502, a first loop 504, a second loop 506 executed within the first loop 504, and a third loop 508 executed within the second loop 506. In particular, the system will match the measured polling profile (i.e., the detected sequence of RF transmission events) to all reference reader polling profiles stored in the database. The sub-indices 'R' in FIG. 5 refer to a reference polling profile, whereas the sub-indices 'M' refer to the measured polling profile to be matched. It is noted that FIG. 5 shows a practical implementation of the matching process in the form of a suitable algorithm; the skilled person will appreciate that other implementations are possible as well. Furthermore, it is noted that the algorithm merely uses an exemplary search range. That is to say, other implementations of the algorithm may use a filtered or optimized search range for given applications. The algorithm uses a function to calculate a probability metric describing how good the measured pattern matches with a reference pattern. A basic variant may be the measured count subtracted by the average timing matching error. Further scaling or normalization methods may be applied for refinement.

Figure 6:
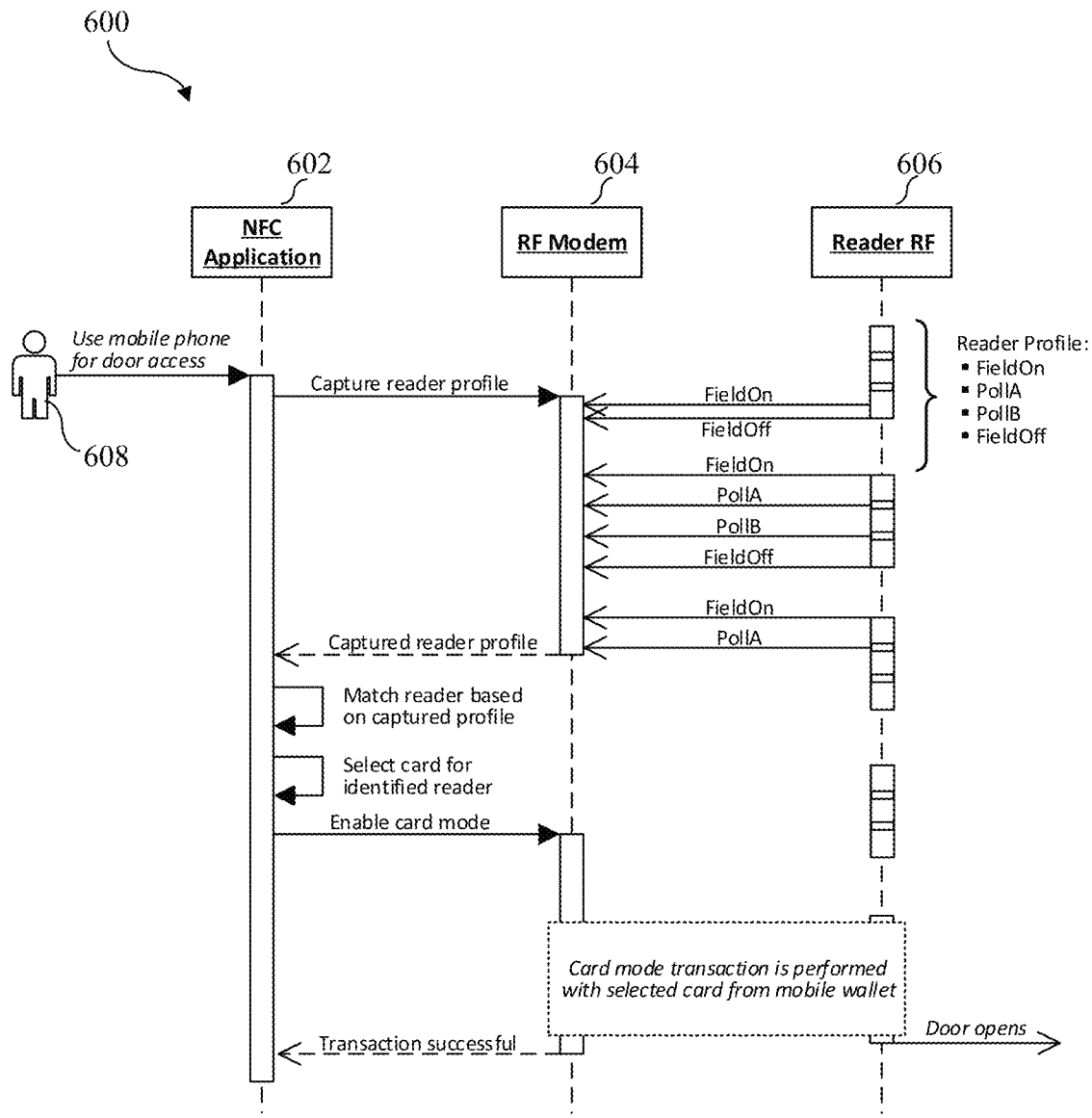
FIG. 6 shows an illustrative embodiment of a sequence diagram.

FIG. 6 shows an illustrative embodiment of a sequence diagram 600. In particular, the diagram 600 shows the communication flow in a use case in which a user wants to enter an area of which the access is protected by a door lock reader. A mobile phone with a corresponding card in a mobile wallet is available. The user registered this door lock reader with the related card upfront. In this example, the user 608 presents his mobile phone to the RF terminal. Then, the NFC application 602 triggers to capture the reader's RF polling profile using the RF modem 604 in "listen-only" configuration. In this example, the RF terminal polls for NFC-A and NFC-B followed by an RF reset. It is noted that in this example the observation window starts when the external RF field 606 is already enabled. This will result in an observed FieldOn event after the actual FieldOn event of the RF terminal. The captured RF events and related timings are provided to the NFC application 602, which then finds the RF polling profile having the highest probability in the database, for example by means of the process shown in FIG. 7. Next, the NFC application 602 selects the card which is linked to the identified reference polling profile from the mobile wallet, enables this card to be emulated in the secure domain and configures the RF modem 604 to perform a CM transaction. After a successful transaction, the door is opened by the door lock reader and the user 608 is notified by the NFC application 602.

Figure 7:
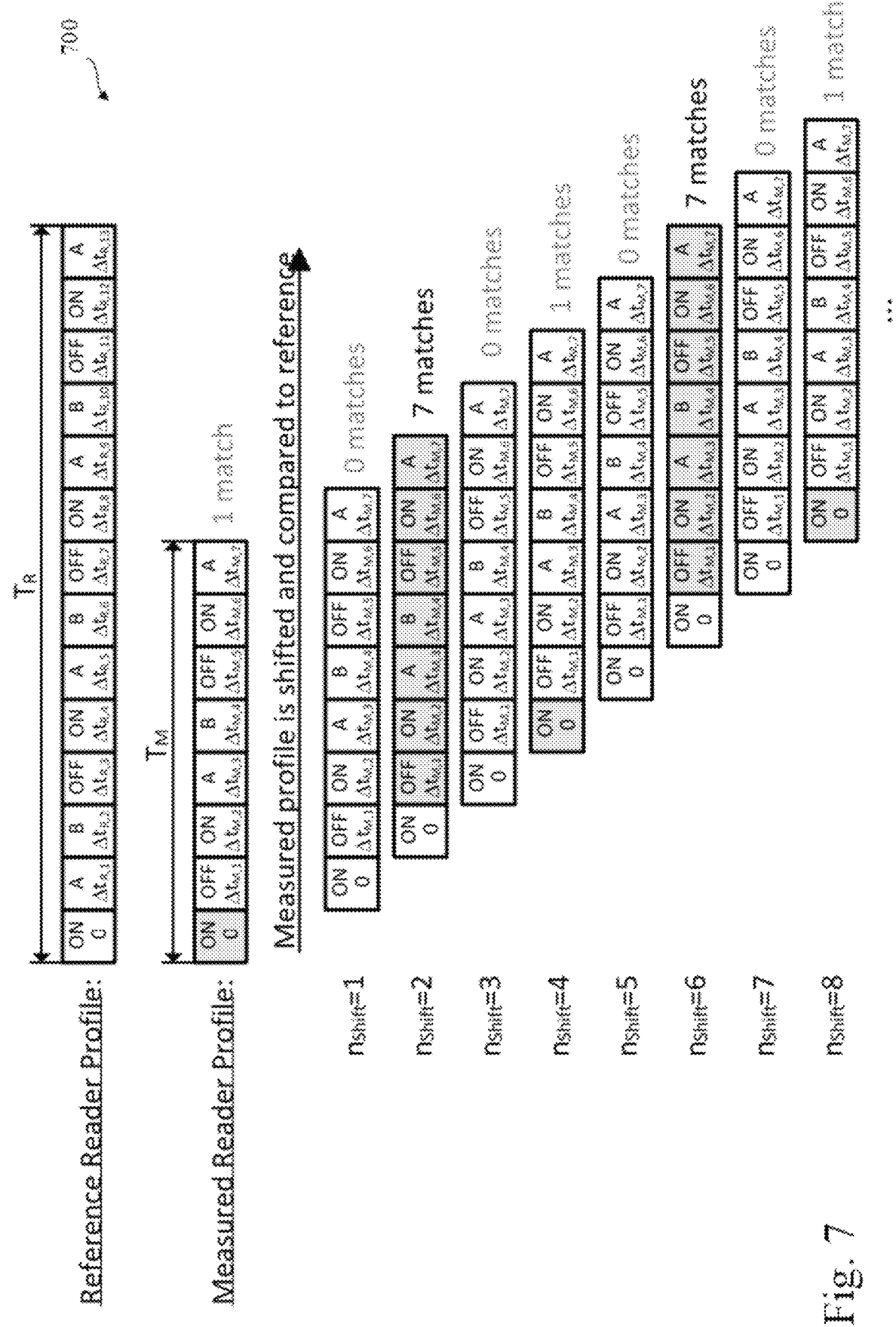
FIG. 7 shows an illustrative embodiment of a pattern matching process.

FIG. 7 shows an illustrative embodiment of a pattern matching process 700. In particular, a basic matching principle is shown which may be used in the aforementioned matching algorithm. In this practical implementation, a detected sequence (i.e., measured reader profile 704) is shifted along one of the predetermined sequences in order to compare the detected sequence with the predetermined sequence (i.e., reference reader profile 702). The profiles contain RF transmission events and associated time differences between consecutive events. The measured RF polling profile 704 is compared to the reference polling profile 702. In this example, the algorithm shifts the measured RF polling profile 702 one by one and checks for every condition how many sequential matches are found. For a constellation with more than one match, the corresponding probability is computed, which allows to find the best matching RF terminal.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information. As used herein, a "computer-readable medium" or "storage medium" may be any means that can contain, store, communicate, propagate, or transport a computer program for use by or in connection with the instruction execution system, apparatus, or device.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC device
102 communication unit
104 profile determination unit
106 card selection unit
108 processing unit
200 method of operating an NFC device
202 communicatively coupling a communication unit to an NFC reader
204 determining, by a profile determination unit, a polling profile of said NFC reader, wherein the polling profile represents a sequence of predefined radio frequency, RF, transmission events, and wherein the profile determination unit determines said polling profile by comparing a detected sequence of RF transmission events with one or more predetermined sequences
206 selecting, by the card selection unit, a specific one of a plurality of emulated cards in dependence on the polling profile determined by the profile determination unit
208 using, by the processing unit, the specific emulated card for executing an application
300 NFC system
302 NFC device
304 RF modem
306 secure domain
308 secure card emulator
310 mobile wallet
312 reader polling profile likelihood based automatic card selection
314 polling profile to card mapping database
316 NFC reader terminal
400 sequence of RF transmission events
402 event "FieldOn"
404 event "PollA"
406 event "PollB"
408 event "FieldOff"
410 event "FieldOn"
500 polling profile matching process
502 initialization step
504 first loop
506 second loop
508 third loop
600 sequence diagram
602 NFC application
604 RF modem
606 reader RF
608 user carrying mobile phone
700 pattern matching process
702 reference reader profile
704 measured reader profile

The invention claimed is:

1. A near field communication, NFC, device, comprising:
a communication unit configured to be communicatively coupled to an NFC reader;
a processing unit configured to use a plurality of emulated cards for executing one or more applications;
a profile determination unit configured to determine a polling profile of said NFC reader, wherein the polling profile represents a sequence of predefined radio frequency, RF, transmission events, and wherein the profile determination unit is configured to determine said polling profile by comparing a detected sequence of RF transmission events with one or more predetermined sequences; and
a card selection unit configured to select a specific one of said emulated cards for use by the processing unit in dependence on the polling profile determined by the profile determination unit, wherein the profile determination unit comprises:
a detector configured to detect the sequence of predefined RF transmission events when the communication unit is communicatively coupled to the NFC reader; and
a comparator configured to compare the detected sequence of predefined RF transmission events with the predetermined sequences and output one of said predetermined sequences as the determined polling profile, and wherein the detector is configured to detect the number of predefined RF transmission events and the periods elapsing between said predefined RF transmission events, and wherein the comparator is configured to compare both said number and said periods with corresponding numbers and periods of each of the predetermined sequences.

2. The NFC device of claim 1, wherein the comparator is configured to output the predetermined sequence that is most similar to or equal to the detected sequence of predefined RF transmission events as the determined polling profile.

3. The NFC device of claim 1, wherein the card selection unit is configured to select said specific emulated card using a programmable mapping table in which predetermined sequences are mapped to said emulated cards.

4. The NFC device of claim 3, further comprising a non-volatile memory configured to store the programmable mapping table.

5. The NFC device of claim 1, wherein the profile determination unit is further configured to operate in a learning mode in which the predetermined sequences are captured.

6. The NFC device of claim 5, wherein the profile determination unit is configured, when operating in a regular mode, to determine the polling profile of the NFC reader in a first observation window, and wherein the profile determination unit is configured, when operating in the learning mode, to capture the predetermined sequences in a second observation window, wherein the second observation window is longer than the first observation window.

7. The NFC device of claim 1, wherein, when the detected sequence of RF transmission events is shorter than the predetermined sequences, the profile determination unit is configured to shift the detected sequence along each of the predetermined sequences in order to compare the detected sequence with the predetermined sequences.

8. The NFC device of claim 1, wherein said emulated cards are used for carrying out transactions with the NFC reader.

9. A method of operating a near field communication, NFC, device, the NFC device comprising a communication unit, a processing unit, a profile determination unit and a card selection unit, the method comprising:
- communicatively coupling the communication unit to an NFC reader;
- determining, by the profile determination unit, a polling profile of said NFC reader, wherein the polling profile represents a sequence of predefined radio frequency, RF, transmission events, and wherein the profile determination unit determines said polling profile by comparing a detected sequence of RF transmission events with one or more predetermined sequences;
- selecting, by the card selection unit, a specific one of a plurality of emulated cards in dependence on the polling profile determined by the profile determination unit; and
- using, by the processing unit, the specific emulated card for executing an application, wherein the profile determination unit comprises a detector and a comparator, and wherein:
- the detector detects the sequence of predefined RF transmission events when the communication unit is communicatively coupled to the NFC reader; and
- the comparator compares the detected sequence of predefined RF transmission events with the predetermined sequences and outputs one of said predetermined sequences as the determined polling profile, and wherein the detector detects the number of predefined RF transmission events and the periods elapsing between said predefined RF transmission events, and wherein the comparator compares both said number and said periods with corresponding numbers and periods of each of the predetermined sequences.

10. The method of claim 9, wherein the comparator outputs the predetermined sequence that is most similar to or equal to the detected sequence of predefined RF transmission events as the determined polling profile.

11. The method of claim 9, wherein the card selection unit selects said specific emulated card using a programmable mapping table in which predetermined sequences are mapped to said emulated cards.

12. The method of claim 11, wherein the programmable mapping table is stored in a non-volatile memory comprised in the NFC device.

13. The method of claim 9, wherein the profile determination unit captures the predetermined sequences when operating in a learning mode.

14. The method of claim 13, wherein the profile determination unit determines, when operating in a regular mode, the polling profile of the NFC reader in a first observation window, and wherein the profile determination unit captures, when operating in the learning mode, the predetermined sequences in a second observation window, wherein the second observation window is longer than the first observation window.

15. The method of claim 9, wherein a computer program comprises executable instructions stored in a non-transitory computer-readable medium, the executable instructions, when executed by an NFC device, cause the NFC device to carry out the method.

* * * * *